(12) United States Patent
Tanoue et al.

(10) Patent No.: US 9,761,907 B2
(45) Date of Patent: Sep. 12, 2017

(54) POSITIVE-ELECTRODE ACTIVE-MATERIAL POWDER AND MANUFACTURING METHOD THEREFOR

(71) Applicant: DOWA HOLDINGS CO., LTD., Tokyo (JP)

(72) Inventors: Koji Tanoue, Tokyo (JP); Yoshiaki Aiki, Tokyo (JP)

(73) Assignee: DOWA HOLDINGS CO., LTD., Tokyo (JP)

( * ) Notice: Subject to any disclaimer, the term of this patent is extended or adjusted under 35 U.S.C. 154(b) by 30 days.

(21) Appl. No.: 14/787,004

(22) PCT Filed: May 6, 2014

(86) PCT No.: PCT/JP2014/062208
§ 371 (c)(1),
(2) Date: Oct. 26, 2015

(87) PCT Pub. No.: WO2014/181784
PCT Pub. Date: Nov. 13, 2014

(65) Prior Publication Data
US 2016/0093914 A1 Mar. 31, 2016

(30) Foreign Application Priority Data
May 7, 2013 (JP) ................................. 2013-098012

(51) Int. Cl.
| | | |
|---|---|---|
| *H01M 10/0562* | (2010.01) | |
| *H01M 4/485* | (2010.01) | |
| *H01M 4/525* | (2010.01) | |
| *H01M 4/505* | (2010.01) | |
| *H01M 4/1391* | (2010.01) | |
| *H01M 4/62* | (2006.01) | |
| *H01M 4/04* | (2006.01) | |
| *C01B 25/45* | (2006.01) | |
| *H01M 4/36* | (2006.01) | |
| *H01M 10/0525* | (2010.01) | |
| *H01M 4/02* | (2006.01) | |
| *H01M 4/58* | (2010.01) | |

(52) U.S. Cl.
CPC ......... *H01M 10/0562* (2013.01); *C01B 25/45* (2013.01); *H01M 4/0471* (2013.01); *H01M 4/1391* (2013.01); *H01M 4/485* (2013.01); *H01M 4/505* (2013.01); *H01M 4/525* (2013.01); *H01M 4/62* (2013.01); *H01M 4/366* (2013.01); *H01M 4/5825* (2013.01); *H01M 10/0525* (2013.01); *H01M 2004/028* (2013.01); *H01M 2300/0068* (2013.01); *H01M 2300/0071* (2013.01)

(58) Field of Classification Search
CPC .......... H01M 10/0562; H01M 4/0471; H01M 4/1391; H01M 4/62; H01M 4/505; H01M 4/485; H01M 4/525; H01M 4/5825; H01M 10/0525; H01M 2004/028; H01M 2300/0071; H01M 2300/0068; H01M 4/366; H01M 2300/0094
See application file for complete search history.

(56) References Cited

U.S. PATENT DOCUMENTS

| | | | | |
|---|---|---|---|---|
| 2011/0065006 A1* | 3/2011 | Ogasa | ................. | H01M 4/0471 |
| | | | | 429/319 |
| 2012/0104334 A1* | 5/2012 | Lee | ....................... | H01M 4/131 |
| | | | | 252/519.12 |

FOREIGN PATENT DOCUMENTS

| | | |
|---|---|---|
| JP | 2008-226463 | 9/2008 |
| JP | 2011-086610 | 4/2011 |
| JP | 2012-048890 | 3/2012 |
| JP | 2012-074240 | 4/2012 |
| JP | 2012-089472 | 5/2012 |
| JP | 2012-099482 | 5/2012 |
| JP | 2013-026003 | 2/2013 |

* cited by examiner

*Primary Examiner* — Stewart Fraser
(74) *Attorney, Agent, or Firm* — Clark & Brody

(57) ABSTRACT

A positive electrode active material for a lithium ion secondary cell, in which the amount of a transition metal present in the vicinity of the outermost surface thereof is significantly decreased is provided. A solid electrolyte-coated positive electrode active material powder contains particles of a positive electrode active material for lithium ion secondary cell, containing a composite oxide of Li and a transition metal M, having on a surface thereof a coating layer of a solid electrolyte represented by $Li_{1+x}Al_xTi_{2-x}(PO_4)_3$, wherein $0 £ X £ 0.5$. An average proportion of a total atom number of Al, Ti and P in a total atom number of Al, Ti, M and P within an etching depth of 1 nm from the outermost surface determined by analysis in a depth direction with XPS is 50% or more. The transition metal M is, for example, at least one kind of Co, Ni and Mn.

14 Claims, No Drawings

POSITIVE-ELECTRODE ACTIVE-MATERIAL POWDER AND MANUFACTURING METHOD THEREFOR

TECHNICAL FIELD

The present invention relates to a positive electrode active material powder formed of particles containing positive electrode active material particles for a lithium ion secondary cell having coated on the surface thereof a solid electrolyte, and a manufacturing method therefor.

BACKGROUND ART

A positive electrode active material for a lithium ion secondary cell has been generally constituted by a composite oxide of Li and a transition metal. In the composite oxide, lithium cobaltate ($LiCoO_2$), which is a composite oxide containing Co as a component, has been frequently used. In recent years, there is increasing use of lithium nickelate ($LiNiO_2$), lithium manganate ($LiMn_2O_4$), a ternary oxide (such as $LiNi_{1/3}Mn_{1/3}Co_{1/3}O_2$), and composite materials thereof.

As an electrolytic solution for a lithium ion secondary cell, solutions obtained by dissolving a lithium salt, such as $LiPF_6$ and $LiBF_4$ electrolyte, in a mixed solvent of a cyclic carbonate ester, such as PC (propylene carbonate) and EC (ethylene carbonate), and a linear ester, such as DMC (dimethyl carbonate), EMC (ethyl methyl carbonate) and DEC (diethyl carbonate), have been mainly used. These organic solvents are liable to be deteriorated in an oxidative atmosphere, and are particularly liable to undergo oxidative decomposition reaction on being in contact with a transition metal, such as Co, Ni and Mn, on the surface of the positive electrode. It is considered that the causes thereof include the high electric potential on the surface of the positive electrode, and the catalytic action of the transition metal in a highly oxidized state. Accordingly, for maintaining the capability of the electrolytic solution, it may be effective to prevent the electrolytic solution as much as possible from being in contact with the transition metal (such as one or more kinds of Co, Ni and Mn) constituting the positive electrode active material.

CITATION LIST

Patent Literatures

PTL 1: JP-A-2008-226463
PTL 2: JP-A-2012-74240

SUMMARY OF INVENTION

Technical Problem

PTL 1 describes a technique of coating a positive electrode active material with a solid electrolyte. PTL 1 describes that mechanical milling is preferred for the coating method (see paragraph 0017). In this case, such a coated state is obtained that particles of the solid electrolyte are attached to the surface of the active material (see symbols 2 and 3 in FIG. 1 of PTL 1). Accordingly, the layer of the solid electrolyte present on the surface of the active material has many voids. There is thus room of improvement in prevention of the electrolytic solution from being in contact with the transition metal on the surface of the active material.

An object of the invention is to provide a positive electrode active material for a lithium ion secondary cell, in which the amount of a transition metal present in the vicinity of the outermost surface thereof is significantly decreased.

Solution to Problem

The object may be achieved by solid electrolyte-coated positive electrode active material powder containing particles of a positive electrode active material for lithium ion secondary cell, containing a composite oxide of Li and a transition metal M, having on a surface thereof a coating layer of a solid electrolyte represented by $Li_{1+X}Al_XTi_{2-X}(PO_4)_3$, wherein $0 \leq X \leq 0.5$, an average proportion of a total atom number of Al and Ti in a total atom number of Al, Ti and M in the coating layer within an etching depth of 1 nm from the outermost surface thereof determined by analysis in a depth direction with XPS (which may be hereinafter referred to as an average Al+Ti atomic ratio) being 35% or more. It is a preferred embodiment of the solid electrolyte-coated positive electrode active material powder that in the case where P is included in the element to be analyzed, an average proportion of a total atom number of Al, Ti and P in a total atom number of Al, Ti, M and P in the coating layer within an etching depth of 1 nm from the outermost surface thereof determined by analysis in a depth direction with XPS (which may be hereinafter referred to as an average Al+Ti+P atomic ratio) is 50% or more. The etching depth herein is a depth that is calculated with the sputtering etching rate of the $SiO_2$ standard specimen.

The transition metal M means one or more kinds of transition metal elements constituting the positive electrode active material, and examples thereof include at least one kind of Co, Ni and Mn. The coating layer of the solid electrolyte may be formed, for example, by coating the surface of the particles of the active material with a solid matter layer containing elements including Li, Al, Ti and P or elements including Li, Ti and P by utilizing the contact of the surface of the particles with a solution containing the elements, and subjecting the particles to a heat treatment in an oxygen-containing atmosphere.

Specific examples of the coating process include the following.

Method of Evaporation to Dryness

A step of mixing an aqueous solution containing elements including Li, Al, Ti and P or elements including Li, Ti and P dissolved therein and powder particles of a positive electrode active material for a lithium ion secondary cell constituted by a composite oxide containing Li and a transition metal M as components, and evaporating the liquid component to provide a solid content.

Method of Submerged Coating

A step of preparing an aqueous solution containing elements including Li, Al, Ti and P or elements including Li, Ti and P dissolved therein (which is referred to as a liquid A) and a liquid containing powder particles of a positive electrode active material for a lithium ion secondary cell constituted by a composite oxide containing Li and a transition metal M as components dispersed in a water soluble organic solvent or a mixed medium of a water soluble organic solvent and water (which is referred to as a liquid B), and adding the liquid A to the liquid B to coat Li, Al, Ti and P or Li, Ti and P on the surface of the powder particles in the liquid B.

In the method of submerged coating, a slurry containing the powder particles after coating may be subjected to solid-liquid separation to recover a solid content. The method of adding the liquid A may be either a continuous method or an intermittent method.

The solid content obtained by the method of evaporation to dryness or the method of submerged coating may be baked in an oxygen-containing atmosphere to provide the solid electrolyte-coated positive electrode active material powder.

Advantageous Effects of Invention

The powder of a positive electrode active material for a lithium ion secondary cell according to the invention is constituted by particles that have a coating layer formed of a solid electrolyte having high homogeneity. The powder has a significantly decreased amount of a transition metal present in the vicinity of the outermost surface of the particles, and thus has a high capability of preventing the electrolytic solution from being oxidized. Accordingly, the invention may contribute to the enhancement of the performance of the lithium ion secondary cell.

DESCRIPTION OF EMBODIMENTS

Positive Electrode Active Material

The positive electrode active material that may be applied to the invention contains a composite oxide of Li and a transition metal M, and includes materials that have conventionally been used in a lithium ion secondary cell. Examples thereof include lithium cobaltate ($Li_{1+X}CoO_2$, wherein $-0.1 \leq X \leq 0.3$). The raw material powder formed of the positive electrode active material may be coated with a solid electrolyte described later, thereby providing the solid electrolyte-coated positive electrode active material powder of the invention. The average particle diameter (50% volume cumulative particle diameter $D_{50}$ measured with a laser diffraction particle size distribution analyzer) may be, for example, in a range of from 1 to 20 μm.

Examples of the positive electrode active material that may be applied to the invention also include, in addition to lithium cobaltate described above, $Li_{1+X}NiO_2$, $Li_{1+X}Mn_2O_4$, $Li_{1+X}Ni_{1/2}Mn_{1/2}O_2$ and $Li_{1+X}Ni_{1/3}Co_{1/3}Mn_{1/3}O_2$ (wherein $-0.1 \leq X \leq 0.3$), $Li_{1-X}(Ni_YLi_{1/3-2Y/3}Mn_{2/3-Y/3})O_2$ (wherein $0 \leq X \leq 1$, and $0 < Y < 1/2$), lithium transition metal oxides obtained by replacing part of Li or the transition metal of these compounds with Al or other elements, and a phosphate salt having an olivine structure, such as $Li_{1+X}FePO_4$ and $Li_{1+X}MnPO_4$ (wherein $-0.1 \leq X \leq 0.3$).

Solid Electrolyte

The solid electrolyte constituting the coating layer is represented by $Li_{1+X}Al_XTi_{2-X}(PO_4)_3$, wherein $0 \leq X \leq 0.5$. The value of X that exceeds 0.5 is not preferred since the Li ionic conductivity may be lowered. The value of X may be 0. In this case, the Li ionic conductivity may be inferior to one containing Al, but may be better than $LiNbO_3$.

Average Al+Ti Atomic Ratio of Surface Layer

The solid electrolyte-coated positive electrode active material according to the invention has a coating layer having high homogeneity, and thus the exposure of the positive electrode active material on the surface of the raw material powder is considerably small. According to the investigations by the present inventors, in consideration of the effect of preventing the electrolytic solution in a lithium secondary cell from being oxidized, the exposure ratio of the positive electrode active material on the surface of the raw material powder may be evaluated with an atomic ratio within a depth of 1 nm from the outermost surface in the elemental analysis profile in the depth direction with XPS (photoelectron spectroscopy). The value of 1 nm is a depth that is calculated with the etching rate of the $SiO_2$ standard specimen.

Specifically, the average proportion of the total atom number of Al and Ti in the total atom number of Al, Ti and M within a depth of 1 nm from the outermost surface determined by analysis in the depth direction with XPS (which may be referred herein to as the average Al+Ti atomic ratio) is desirably 35% or more, more preferably 40% or more, and further preferably 60% or more. According to the experiments, the average Al+Ti atomic ratio of approximately 98% can be obtained. The symbol M means a transition metal other than Ti, and examples thereof include at least one kind of Co, Ni and Mn.

The Al+Ti atomic ratio at a certain depth may be shown by the following expression (1).

$$\text{Al+Ti atomic ratio (\%)} = (\text{Al+Ti})/(\text{Al+Ti+M}) \times 100 \quad (1)$$

In the expression, the element symbols and M each represent the analytical value (% by atom) of the corresponding element.

In the case where M represents Co, the following expression (2) may be applied.

$$\text{Al+Ti atomic ratio (\%)} = (\text{Al+Ti})/(\text{Al+Ti+Co}) \times 100 \quad (2)$$

Average Al+Ti+P Atomic Ratio of Surface Layer

Instead of the average Al+Ti atomic ratio, average Al+Ti+P atomic ratio with P included in the analysis may be applied.

Specifically, the average proportion of the total atom number of Al and Ti in the total atom number of Al, Ti, P and M in the coating layer within a depth of 1 nm from the outermost surface thereof determined by analysis in the depth direction with XPS is referred herein to as the average Al+Ti+P atomic ratio. The average Al+Ti+P atomic ratio is desirably 50% or more, more preferably 70% or more, and further preferably 80% or more. According to the experiments, the average Al+Ti+P atomic ratio of approximately 98% can be obtained. The symbol M means a transition metal other than Ti.

The Al+Ti+P atomic ratio at a certain depth may be shown by the following expression (3).

$$\text{Al+Ti+P atomic ratio (\%)} = (\text{Al+Ti+P})/(\text{Al+Ti+M+P}) \times 100 \quad (3)$$

In the expression, the element symbols and M each represent the analytical value (% by atom) of the corresponding element.

In the case where M represents Co, the following expression (4) may be applied.

$$\text{Al+Ti+P atomic ratio (\%)} = (\text{Al+Ti+P})/(\text{Al+Ti+Co+P}) \times 100 \quad (4)$$

Average Thickness of Coating layer

The average thickness of the coating layer may be in a range of from 1 to 80 nm. When the thickness is too small, an exposure portion is liable to be formed on the surface of the raw material powder. When the thickness is too large, the conductivity may be lowered, and it may not be economical.

Coating of Solid Electrolyte

The coating layer having high homogeneity may be achieved by coating a solution containing elements including Li, Al, Ti and P or elements including Li, Ti and P. Specifically, a solid matter layer containing the elements is coated on the surface of the raw material powder particles of the positive electrode active material for lithium ion secondary cell by making a liquid containing elements including Li, Al, Ti and P or elements including Li, Ti and P in contact therewith, and then the solid matter layer is crystallized by subjecting the particles to a heat treatment in an oxygen-containing atmosphere, so as to form the layer of a solid electrolyte. Examples of the method of coating the solid matter layer include (i) a method of evaporation to dryness, in which the raw material powder particles are placed directly in a liquid containing elements including Li, Al, Ti and P or elements including Li, Ti and P, followed by stirring, and then the liquid component therein is evaporated to dryness, and (ii) a method of submerged coating, in which the raw material powder is stirred in a liquid to form a dispersion state, and a preparation liquid containing elements including Li, Al, Ti and P or elements including Li, Ti and P is gradually added thereto to be attached to the surface of the powder particles, followed by filtering. For forming the coating layer that is thin and homogeneous, the later method may be advantageous.

In the method of submerged coating, examples of the solvent used in the liquid for dispersing the raw material powder (liquid B) include a proton-donating solvent, such as methanol, ethanol, propanol, butanol, pentanol and hexanol, an ether compound (such as diethyl ether and tetrahydrofuran), and a polar non-proton-donating solvent, such as dimethylsulfoxide $(CH_3)_2SO$ (abbreviation: DMSO), dimethylformamide $(CH_3)_2NCHO$ (abbreviation: DMF) and hexamethylphosphoric triamide $((CH_3)_2N)_3P=O$ (abbreviation: HMPA).

Examples of the solution used in the coating (which is the liquid A in the method of submerged coating) include solutions containing dissolved therein titanium in the form of $(Ti(OH)_3O_2)^-$, lithium in the form of $Li^+$, aluminum in the form of $AlO_2^-$, $(Al(OH)_4)^-$ or $(Al(OH)_4(H_2O)_2)^-$, and phosphorus in the form of $PO_4^{3-}$, $HPO_4^{2-}$ or $H_2PO_4^-$.

As described above, after forming the solid matter layer containing elements including Li, Al, Ti and P or elements including Li, Ti and P on the surface of the raw material powder particles, the particles are subjected to a heat treatment in an oxygen-containing atmosphere, thereby forming the coating layer. The heat treatment atmosphere is preferably the air containing no carbon dioxide, or oxygen. When the atmosphere contains carbon dioxide, a layer of lithium carbonate may be formed and may be a factor of increasing the internal resistance of the cell. The material represented by $Li_{1+X}Al_XTi_{2-X}(PO_4)_3$, wherein $0 \leq X \leq 0.5$, may start crystallization at approximately 300° C. or more, and thus the heat treatment temperature is preferably 300° C. or more, and more preferably 500° C. or more. The crystallization rate may be significantly increased at a temperature of 500° C. or more. However, when the temperature exceeds 950° C., the diffusion of the solid electrolyte into the interior of the active material may be increased, and thus the temperature is preferably 950° C. or less.

EXAMPLE

In the following description, in the material represented by $Li_{1+X}Al_XTi_{2-X}(PO_4)_3$, wherein $0 \leq X \leq 0.5$, one having X>0 (i.e., containing Al) is referred to as LATP, and one having X=0 (i.e., containing no Al) is referred to as LTP. The liquid for coating elements including Li, Al, Ti and P is referred to as an LATP coating liquid, and the liquid for coating elements including Li, Ti and P is referred to as an LTP coating liquid.

Example 1

As raw material powder of a positive electrode active material for a lithium ion secondary cell, lithium cobaltate $(LiCoO_2)$ powder having an average particle diameter (which was a 50% volume cumulative particle diameter $D_{50}$ measured with a laser diffraction particle size distribution analyzer, hereinafter the same) of 5.14 μm and a BET value of 0.234 m²/g was prepared.

Preparation of LATP Coating Liquid 29 g of hydrogen peroxide water having a concentration of 30% by mass was added to 17 g of pure water to prepare a hydrogen peroxide aqueous solution. 0.335 g of titanium powder (produced by Wako Pure Chemical Industries, Ltd.) was added to the hydrogen peroxide aqueous solution, and then 5 g of aqueous ammonia having a concentration of 28% by mass was further added thereto, followed by sufficiently stirring, to provide a yellow transparent solution. 0.225 g of lithium hydroxide monohydrate $(LiOH \cdot H_2O)$ and 1.63 g of diammonium hydrogen phosphate $((NH_4)_2HPO_4)$ were added to the solution. 0.0335 g of aluminum foil, 8 g of aqueous ammonia having a concentration of 28% by mass and 200 g of pure water were further added to the solution, followed by continuously stirring for hours until the solution became transparent, thereby providing an LATP coating liquid.

Coating of LATP 30 g of the lithium cobaltate powder was added to the LATP coating liquid, followed by stirring with a stirrer. The solution was heated to 90° C., and the temperature of 90° C. was maintained until it was determined that the water content disappeared by visual observation, thereby providing powder. Thereafter, the powder was dried by heating in the air at 140° C. for 1 hour to provide dried powder. The dried powder thus obtained was baked in the air at 600° C. for 1 hour, thereby providing lithium cobaltate powder having LATP coated on the surface thereof (powder specimen).

The average thickness of the LATP coating layer of the powder specimen, which was calculated from the BET value (specific surface area) of the raw material powder and the LATP raw materials used, was 77 nm.

Measurement of Average Al+Ti Atomic Ratio and Average Al+Ti+P Atomic Ratio of Powder Specimen The XPS measurement of the average Al+Ti atomic ratio and the average Al+Ti+P atomic ratio of the powder specimen having the LATP layer formed on the surface of the particles was performed with PHI5800 ESCA SYSTEM, produced by Ulvac-Phi, Inc. The analysis area had a diameter of 800 μm, the X-ray source was an Al tube, the output of the X-ray source was 150 W, the analysis angle was 45°, and the spectrum species were the 2p orbital for Co, the 2p orbital for Ti, the 2p orbital for Al, and the 2p orbital for P. For the analysis of Mn and Ni, the spectrum species each were the 2p orbital. The background process was performed by the Shirley's method. The measurement was performed for 11 points from the outermost surface to a depth of 1 nm in terms of $SiO_2$ etching depth every 0.1 nm, the Al+Ti atomic ratios for the respective depth points were obtained by the expression (2), the Al+Ti+P atomic ratios for the respective depth points were obtained by the expression (4), and the average values of the values for the 11 points were designated as the average Al+Ti atomic ratio and the average Al+Ti+P atomic ratio, respectively, of the powder specimen.

Chemical Analysis of Powder Specimen

The powder specimen was dissolved in nitric acid or the like, and subjected to chemical analysis with ICP. The ratios of Al, Ti and P that were substantially the same as those of the raw materials used were found in the powder.

The results are shown in Table 2 (which is the same as in Examples below).

Evaluation of Cell

A test cell was produced by using the following materials.

Positive electrode: The powder specimen (positive electrode active material), graphite and PTFE (polytetrafluoroethylene) were mixed at a mass ratio of 87/8/8 in a mortar, and the mixture was kneaded and formed into a sheet with a rolling machine.

Negative electrode: metallic Li

Separator: polypropylene film

Electrolytic solution: $LiPF_6$ as an electrolyte was dissolved in a concentration of 1 mol/L in a solvent containing ethylene carbonate and diethylene carbonate mixed at a volume ratio of 1/1.

The cell thus produced was measured for the following discharge capacities A and B, from which the capacity retention ratio was obtained.

(1) Discharge Capacity A

The cell was subjected to constant current charge at a current density of 0.16 mA/cm$^2$ until 4.2 V, and then subjected to constant voltage charge until a current density of 0.016 mA/cm$^2$. Thereafter, the cell was subjected to constant current discharge at 0.16 mA/cm$^2$ until 2.7 V, thereby obtaining the discharge capacity of the positive electrode active material per unit mass (except for the mass of the coated matter), which was designated as the discharge capacity A.

(2) Discharge Capacity B

Thereafter, the cell was subjected to constant current charge at a current density of 0.16 mA/cm$^2$ until 4.2 V, and after maintaining the cell at 4.2 V for one month, the cell was subjected to constant current discharge at 0.16 mA/cm$^2$ until 2.7 V, thereby obtaining the discharge capacity of the positive electrode active material per unit mass (except for the mass of the coated matter), which was designated as the discharge capacity B.

(3) Capacity Retention Ratio

The capacity retention ratio (%) was obtained by the following expression (5).

Capacity retention ratio (%)=(discharge capacity $B$/discharge capacity $A$)×100    (5)

A higher capacity retention ratio is considered as a cell capability more favorably retained. The results are shown in Table 3 (which is the same as in Examples below).

Example 2

A powder specimen was produced and measured under the same condition as in Example 1 except that the LATP coating liquid was produced in the following manner.

Preparation of LATP Coating Liquid 4 g of hydrogen peroxide water having a concentration of 30% by mass was added to 17 g of pure water to prepare a hydrogen peroxide aqueous solution. 0.043 g of titanium powder (produced by Wako Pure Chemical Industries, Ltd.) was added to the hydrogen peroxide aqueous solution, and then 1 g of aqueous ammonia having a concentration of 28% by mass was further added thereto, followed by sufficiently stirring, to provide a yellow transparent solution. 0.029 g of lithium hydroxide monohydrate ($LiOH.H_2O$) and 0.21 g of diammonium hydrogen phosphate ($(NH_3)_2HPO_4$) were added to the solution. 0.00435 g of aluminum foil, 1 g of aqueous ammonia having a concentration of 28% by mass and 200 g of pure water were further added to the solution, followed by continuously stirring for hours until the solution became transparent, thereby providing an LATP coating liquid.

The powder specimen has an average thickness of LATP coating layer of 10 nm. As a result of ICP analysis, the ratios of Al, Ti and P that were substantially the same as those of the raw materials used were found in the powder.

Example 3

As raw material powder, the same lithium cobaltate ($LiCoO_2$) powder as in Example 1 was prepared.

Preparation of LATP Coating Liquid 4 g of hydrogen peroxide water having a concentration of 30% by mass was added to 2 g of pure water to prepare a hydrogen peroxide aqueous solution. 0.043 g of titanium powder (produced by Wako Pure Chemical Industries, Ltd.) was added to the hydrogen peroxide aqueous solution, and then 1 g of aqueous ammonia having a concentration of 28% by mass was further added thereto, followed by sufficiently stirring, to provide a yellow transparent solution. 0.029 g of lithium hydroxide monohydrate ($LiOH.H_2O$) and 0.21 g of diammonium hydrogen phosphate ($(NH_3)_2HPO_4$) were added to the solution. 0.0044 g of aluminum foil, 1 g of aqueous ammonia having a concentration of 28% by mass and 30 g of pure water were further added to the solution, followed by continuously stirring for hours until the solution became transparent, thereby providing an LATP coating liquid (liquid A).

Coating of LATP 100 g of isopropyl alcohol and 30 g of lithium cobaltate powder (raw material powder) were placed in a 1.0 L glass beaker and were stirred with a stirrer. The temperature was set at 40° C., and the stirring was maintained at a rotation number of 600 rpm for preventing the raw material powder from being precipitated. The stirring was performed in a nitrogen atmosphere for preventing carbon dioxide gas in the atmosphere from being absorbed. To the resulting solution (liquid B), the LATP coating liquid (liquid A) was continuously added over 120 minutes. After completing the addition, the mixture was stirred in nitrogen under condition of 40° C. and 600 rpm for performing the reaction. After completing the reaction, the resulting slurry was placed in a pressure filter for performing solid-liquid separation. The powder thus obtained as a solid matter was dried in decarbonated air for 1 hour to provide dried powder. The dried powder was baked in the air at 400° C. for 3 hours, thereby providing lithium cobaltate powder having LATP coated on the surface thereof (powder specimen).

The powder specimen has an average thickness of LATP coating layer of 10 nm. As a result of ICP analysis, the ratios of Al, Ti and P that were substantially the same as those of the raw materials used were found in the powder.

The powder specimen was measured in the same manner as in Example 1.

Example 4

A powder specimen was produced and measured under the same condition as in Example 3 except that the LATP coating liquid was produced in the following manner.

Preparation of LATP Coating Liquid 4 g of hydrogen peroxide water having a concentration of 30% by mass was added to 2 g of pure water to prepare a hydrogen peroxide aqueous solution. 0.022 g of titanium powder (produced by Wako Pure Chemical Industries, Ltd.) was added to the hydrogen peroxide aqueous solution, and then 1 g of aqueous ammonia having a concentration of 28% by mass was further added thereto, followed by sufficiently stirring, to provide a yellow transparent solution. 0.015 g of lithium hydroxide monohydrate ($LiOH.H_2O$) and 0.11 g of diammonium hydrogen phosphate (($NH_3)_2HPO_4$) were added to the solution. 0.0022 g of aluminum foil, 1 g of aqueous ammonia having a concentration of 28% by mass and 30 g of pure water were further added to the solution, followed by continuously stirring for hours until the solution became transparent, thereby providing an LATP coating liquid (liquid A).

The powder specimen has an average thickness of LATP coating layer of 5 nm. As a result of ICP analysis, the ratios of Al, Ti and P that were substantially the same as those of the raw materials used were found in the powder.

Example 5

LATP was coated in the following manner by using the same LATP coating liquid as in Example 4. The resulting powder specimen was measured in the same manner as in Example 1.

Coating of LATP 250 g of isopropyl alcohol and 75 g of lithium cobaltate powder (raw material powder) were placed in a 1.0 L glass beaker and were stirred with a stirrer. The temperature was set at 40° C., and the stirring was maintained at a rotation number of 600 rpm for preventing the raw material powder from being precipitated. The stirring was performed in a nitrogen atmosphere for preventing carbon dioxide gas in the atmosphere from being absorbed. To the resulting solution (liquid B), the LATP coating liquid (liquid A) was continuously added over 120 minutes. After completing the addition, the mixture was stirred in nitrogen under condition of 40° C. and 600 rpm for performing the reaction. After completing the reaction, the resulting slurry was placed in a pressure filter for performing solid-liquid separation. The powder thus obtained as a solid matter was dried in decarbonated air for 1 hour to provide dried powder. The dried powder was baked in the air at 600° C. for 3 hours, thereby providing lithium cobaltate powder having LATP coated on the surface thereof (powder specimen).

The powder specimen has an average thickness of LATP coating layer of 2 nm. As a result of ICP analysis, the ratios of Al, Ti and P that were substantially the same as those of the raw materials used were found in the powder.

Example 6

A powder specimen was produced and measured under the same condition as in Example 3 except that the LATP coating liquid in Example 3 was changed to an LTP coating liquid produced in the following manner.

Preparation of LTP Coating Liquid 4 g of hydrogen peroxide water having a concentration of 30% by mass was added to 2 g of pure water to prepare a hydrogen peroxide aqueous solution. 0.051 g of titanium powder (produced by Wako Pure Chemical Industries, Ltd.) was added to the hydrogen peroxide aqueous solution, and then 1 g of aqueous ammonia having a concentration of 28% by mass was further added thereto, followed by sufficiently stirring, to provide a yellow transparent solution. 0.022 g of lithium hydroxide monohydrate ($LiOH.H_2O$) and 0.21 g of diammonium hydrogen phosphate (($NH_3)_2HPO_4$) were added to the solution. 30 g of pure water were further added to the solution, thereby providing an LATP coating liquid (liquid A).

The powder specimen has an average thickness of LATP coating layer of 10 nm. As a result of ICP analysis, the ratios of Ti and P that were substantially the same as those of the raw materials used were found in the powder.

Example 7

A powder specimen was produced and measured under the same condition as in Example 3 except that the solvent of the liquid B on coating LATP was changed from isopropyl alcohol to methanol.

Example 8

A powder specimen was produced and measured under the same condition as in Example 3 except that the solvent of the liquid B on coating LATP was changed from isopropyl alcohol to butanol.

Example 9

A powder specimen was produced and measured under the same condition as in Example 3 except that the solvent of the liquid B on coating LATP was changed from isopropyl alcohol to pentanol.

Comparative Example 1

$Li_2CO_3$, $Al_2O_3$, $TiO_2$ and $(NH_4)_2HPO_4$ were mixed to make a molar ratio $Li_2O/Al_2O_3/TiO_2/P_2O_5$ of 14/9/38/39, and calcined in the air at 700° C. for 2 hours. Subsequently, the mixture was made amorphous by subjecting to a mechanical milling (MM) treatment in a planetary ball mill using pulverization balls formed of zirconium oxide having a diameter of 10 mm at room temperature in an argon gas atmosphere at a rotation number of 350 rpm for 40 hours. Subsequently, the resulting powder was crystallized by heating in the air at 850° C. for 4 hours.

9.5 g of the $LiCoO_2$ raw material powder and 5 g of the crystallized powder above were mixed with a V-blender (produced by Tsutsui Scientific Instruments Co., Ltd.) at 60 rpm for 30 minutes, thereby providing a powder specimen.

As a result of chemical analysis, it was confirmed that the powder specimen had LATP on the surface thereof in an amount that was substantially the same as in Example 1. The powder specimen was measured by XPS in the same manner as in Example 1, and thus the average Al+Ti atomic ratio was 25%, which was lower than the values in Examples described above.

Table 1 shows the coating liquid used in Example 6 (LTP coating liquid containing no Al) and the coating liquid used in Example 3 (LATP coating liquid containing Al). Tables 2 and 3 show the results of Examples and Comparative Examples.

TABLE 1

| Kind of coating liquid | Constitutional components | Amount (g) | molar number | Solid concentration (% by mass) | pH | Note |
|---|---|---|---|---|---|---|
| LTP | Ti source: Ti powder | 0.051 | 0.00107 | 0.56 | 10.1 | Example 6 |
| | $H_2O_2$ (30%) | 4 | 0.0353 | | | |
| | Water | 2 | 0.1111 | | | |
| | $NH_3$ (28%) | 1 | 0.0165 | | | |
| | P source: $(NH_4)_2HPO_4$ | 0.21 | 0.00159 | | | |
| | Li source: $Li(OH) \cdot H_2O$ | 0.022 | 0.00053 | | | |
| | Water | 30 | 1.6667 | | | |
| LATP | Ti source: Ti powder | 0.043 | 0.00090 | 0.54 | 10.6 | Example 3 |
| | $H_2O_2$ (30%) | 4 | 0.0353 | | | |
| | Water | 2 | 0.1111 | | | |
| | $NH_3$ (28%) | 1 | 0.0165 | | | |
| | P source: $(NH_4)_2HPO_4$ | 0.21 | 0.00159 | | | |
| | Li source: $Li(OH) \cdot H_2O$ | 0.029 | 0.00069 | | | |
| | Al source: Al foil | 0.0044 | 0.00016 | | | |
| | $NH_3$ (28%) | 1 | 0.0165 | | | |
| | Water | 30 | 1.6667 | | | |

TABLE 2

| | | LATP or LTP coating layer | | Powder | | | | | | |
|---|---|---|---|---|---|---|---|---|---|---|
| | | Proportion of coating layer in powder | Average thickness of coating layer | Average Al + Ti atomic ratio *1 | Average Al + Ti + P atomic ratio *2 | Chemical analysis value (% by mass) | | | | |
| Example No. | Coating method | (% by mass) | (nm) | (%) | (%) | Li | Co | Ti | Al | P |
| Example 1 | immersion in coating liquid, and evaporation to dryness | 5 | 77 | 96 | 98 | 6.95 | 57.1 | 1.07 | 0.106 | 1.22 |
| Example 2 | immersion in coating liquid, and evaporation to dryness | 0.68 | 10 | 63 | 76 | 7.14 | 59.8 | 0.142 | 0.014 | 0.168 |
| Example 3 | submerged coating (solvent: IPA) | 0.68 | 10 | 90 | 96 | 7.14 | 59.8 | 0.146 | 0.014 | 0.165 |
| Example 4 | submerged coating (solvent: IPA) | 0.34 | 5 | 68 | 80 | 7.17 | 60.0 | 0.072 | 0.007 | 0.084 |
| Example 5 | submerged coating (solvent: IPA) | 0.136 | 2 | 42 | 53 | 7.18 | 60.1 | 0.031 | 0.003 | 0.032 |
| Example 6 | submerged coating (solvent: IPA) | 0.68 | 10 | 92 | 97 | 7.12 | 59.6 | 0.143 | <0.001 | 0.163 |
| Example 7 | submerged coating (solvent: methanol) | 0.68 | 10 | 90 | 96 | 7.05 | 59.8 | 0.144 | 0.014 | 0.175 |
| Example 8 | submerged coating (solvent: butanol) | 0.68 | 10 | 75 | 85 | 7.14 | 60.0 | 0.145 | 0.013 | 0.162 |
| Example 9 | submerged coating (solvent: pentanol) | 0.68 | 10 | 55 | 70 | 7.09 | 58.2 | 0139 | 0.014 | 0.166 |
| Comparative Example 1 | — | 5 | 77 | 25 | 34 | 6.93 | 57.2 | 1.06 | 0.102 | 1.21 |

*1: (Al + Ti)/(Co + Al + Ti) × 100
*2: (Al + Ti + P)/(Co + Al + Ti + P) × 100

TABLE 3

| | Cell characteristics | | |
|---|---|---|---|
| | Discharge capacity (mAh/g) | | Capacity retention ratio B/A |
| Example No. | A | B | (%) |
| Example 1 | 110 | 100 | 91 |
| Example 2 | 120 | 100 | 83 |
| Example 3 | 130 | 125 | 96 |
| Example 4 | 130 | 120 | 92 |

TABLE 3-continued

| | Cell characteristics | | |
|---|---|---|---|
| | Discharge capacity (mAh/g) | Capacity retention ratio B/A | |
| Example No. | A | B | (%) |
| Example 5 | 130 | 110 | 85 |
| Example 6 | 125 | 120 | 96 |
| Example 7 | 130 | 125 | 96 |
| Example 8 | 130 | 120 | 92 |
| Example 9 | 130 | 115 | 88 |
| Comparative Example 1 | 130 | 80 | 62 |

The invention claimed is:

1. Solid electrolyte-coated positive electrode active material powder comprising particles of a positive electrode active material for lithium ion secondary cell, containing a composite oxide of Li and a transition metal M, having on a surface thereof a coating layer of a solid electrolyte represented by $Li_{1+X}Al_XTi_{2-X}(PO_4)_3$, wherein $0 \leq X \leq 0.5$, an average proportion of a total atom number of Al and Ti in a total atom number of Al, Ti and M in the coating layer, an average Al+Ti atomic ratio defined by the following expression (1), within an etching depth of 1 nm from the outermost surface thereof determined by analysis in a depth direction with XPS being 35% or more:

$$\text{Al+Ti atomic ratio (\%)} = (\text{Al+Ti})/\text{Al+Ti+M} \times 100 \qquad (1)$$

wherein the element symbols and M each represent an analytical value of the corresponding element in terms of atomic %.

2. The solid electrolyte-coated positive electrode active material powder according to claim 1, wherein the transition metal M is at least one kind of Co, Ni and Mn.

3. A method for manufacturing the solid electrolyte-coated positive electrode active material powder according to claim 1, comprising:
a step of mixing an aqueous solution containing elements including Li, Al, Ti and P or elements including Li, Ti and P dissolved therein and powder particles of a positive electrode active material for a lithium ion secondary cell constituted by a composite oxide containing Li and a transition metal M as components, and evaporating the liquid component to provide a solid content; and
a step of baking the solid content in an oxygen-containing atmosphere.

4. The method for producing the solid electrolyte-coated positive electrode active material powder according to claim 3, wherein the transition metal M is at least one kind of Co, Ni and Mn.

5. A method for manufacturing the solid electrolyte-coated positive electrode active material powder according to claim 1, comprising:
a step of preparing an aqueous solution containing elements including Li, Al, Ti and P or elements including Li, Ti and P dissolved therein (which is referred to as a liquid A) and a liquid containing powder particles of a positive electrode active material for a lithium ion secondary cell constituted by a composite oxide containing Li and a transition metal M as components dispersed in a water soluble organic solvent or a mixed medium of a water soluble organic solvent and water (which is referred to as a liquid B), and adding the liquid A to the liquid B to coat Li, Al, Ti and P or Li, Ti and P on the surface of the powder particles in the liquid B;
a step of subjecting a slurry containing the powder particles after coating to solid-liquid separation to recover a solid content; and
a step of baking the solid content in an oxygen-containing atmosphere.

6. The method for producing the solid electrolyte-coated positive electrode active material powder according to claim 5, wherein the water soluble organic solvent is a water soluble alcohol.

7. The method for producing the solid electrolyte-coated positive electrode active material powder according to claim 5, wherein the transition metal M is at least one kind of Co, Ni and Mn.

8. Solid electrolyte-coated positive electrode active material powder comprising particles of a positive electrode active material for lithium ion secondary cell, containing a composite oxide of Li and a transition metal M, having on a surface thereof a coating layer of a solid electrolyte represented by $Li_{1+X}Al_XTi_{2-X}(PO_4)_3$, wherein $0 \leq X \leq 0.5$, an average proportion of a total atom number of Al, Ti and P in a total atom number of Al, Ti, M and P in the coating layer, an average Al+Ti+P atomic ratio defined by the following expression (3), within an etching depth of 1 nm from the outermost surface thereof determined by analysis in a depth direction with XPS being 50% or more:

$$\text{Al+Ti+P atomic ratio (\%)} = (\text{Al+Ti+P})/\text{Al+Ti+P+M} \times 100 \qquad (3)$$

wherein the element symbols and M each represent an analytical value of the corresponding element in terms of atomic %.

9. The solid electrolyte-coated positive electrode active material powder according to claim 8, wherein the transition metal M is at least one kind of Co, Ni and Mn.

10. A method for manufacturing the solid electrolyte-coated positive electrode active material powder according to claim 8, comprising:
a step of mixing an aqueous solution containing elements including Li, Al, Ti and P or elements including Li, Ti and P dissolved therein and powder particles of a positive electrode active material for a lithium ion secondary cell constituted by a composite oxide containing Li and a transition metal M as components, and evaporating the liquid component to provide a solid content; and
a step of baking the solid content in an oxygen-containing atmosphere.

11. The method for producing the solid electrolyte-coated positive electrode active material powder according to claim 10, wherein the transition metal M is at least one kind of Co, Ni and Mn.

12. A method for manufacturing the solid electrolyte-coated positive electrode active material powder according to claim 8, comprising:
a step of preparing an aqueous solution containing elements including Li, Al, Ti and P or elements including Li, Ti and P dissolved therein (which is referred to as a liquid A) and a liquid containing powder particles of a positive electrode active material for a lithium ion secondary cell constituted by a composite oxide containing Li and a transition metal M as components dispersed in a water soluble organic solvent or a mixed medium of a water soluble organic solvent and water (which is referred to as a liquid B), and adding the liquid A to the liquid B to coat Li, Al, Ti and P or Li, Ti and P on the surface of the powder particles in the liquid B;

a step of subjecting a slurry containing the powder particles after coating to solid-liquid separation to recover a solid content; and a step of baking the solid content in an oxygen-containing atmosphere.

13. The method for producing the solid electrolyte-coated positive electrode active material powder according to claim 12, wherein the water soluble organic solvent is a water soluble alcohol.

14. The method for producing the solid electrolyte-coated positive electrode active material powder according to claim 12, wherein the transition metal M is at least one kind of Co, Ni and Mn.

* * * * *